(12) United States Patent  
Banerjee et al.

(10) Patent No.: US 10,074,167 B2  
(45) Date of Patent: Sep. 11, 2018

(54) REDUCING REGISTRATION AND DESIGN VICINITY INDUCED NOISE FOR INTRA-DIE INSPECTION

(71) Applicant: KLA-Tencor Corporation, Milpitas, CA (US)

(72) Inventors: Saibal Banerjee, Fremont, CA (US); Ashok Kulkarni, San Jose, CA (US); Shaoyu Lu, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/355,509

(22) Filed: Nov. 18, 2016

(65) Prior Publication Data

US 2017/0161888 A1 Jun. 8, 2017

Related U.S. Application Data

(60) Provisional application No. 62/263,665, filed on Dec. 6, 2015.

(51) Int. Cl.  
*G06T 7/00* (2017.01)

(52) U.S. Cl.  
CPC .......... *G06T 7/0004* (2013.01); *G06T 7/0081* (2013.01); *G06T 2207/10061* (2013.01); *G06T 2207/30148* (2013.01)

(58) Field of Classification Search  
CPC ... G06T 7/0004; G06T 7/0081; G06T 7/0028; G06T 7/0024; G06T 7/0034; G06T 7/0026; G06T 2207/10061; G06T 2207/30148; G06K 9/32  
See application file for complete search history.

(56) References Cited

U.S. PATENT DOCUMENTS

| | | | | |
|---|---|---|---|---|
| 6,164,847 A | * | 12/2000 | Allen | G06T 5/50 400/74 |
| 6,222,513 B1 | * | 4/2001 | Howard | G02B 26/026 345/107 |
| 6,668,075 B1 | * | 12/2003 | Nakamura | G06T 7/0006 348/95 |
| 6,792,061 B1 | * | 9/2004 | Sutu | G06F 7/02 375/368 |
| 9,170,209 B1 | | 10/2015 | Chang et al. | |
| 2001/0017878 A1 | * | 8/2001 | Nozoe | G01N 23/20 374/5 |

(Continued)

OTHER PUBLICATIONS

ISA/KR, International Search Report for PCT/US2016/064482 dated Mar. 13, 2017.

(Continued)

*Primary Examiner* — Amir Alavi  
(74) *Attorney, Agent, or Firm* — Hodgson Russ LLP

(57) ABSTRACT

Noise induced by pattern-of-interest (POI) image registration and POI vicinity design patterns in intra-die inspection is reduced. POI are grouped into alignment groups by co-occurrence of proximate registration targets. The alignment groups are registered using the co-occurrence of proximate registration targets. Registration by voting is performed, which can measure a degree that each of the patterns-of-interest is an outlier. POI are grouped into at least one vicinity group with same vicinity design effects.

18 Claims, 12 Drawing Sheets

(56) References Cited

U.S. PATENT DOCUMENTS

| | | | |
|---|---|---|---|
| 2002/0061125 A1* | 5/2002 | Fujii | G06K 9/00067 382/125 |
| 2003/0156749 A1* | 8/2003 | Nishiura | G06T 7/0004 382/149 |
| 2004/0111230 A1* | 6/2004 | Kosuge | G06K 9/3216 702/94 |
| 2004/0114792 A1* | 6/2004 | Fukui | G06T 7/0004 382/141 |
| 2005/0134551 A1* | 6/2005 | Schmitz | G02B 26/026 345/107 |
| 2010/0232679 A1 | 9/2010 | Naoe et al. | |
| 2013/0064442 A1 | 3/2013 | Chang et al. | |
| 2014/0219544 A1 | 8/2014 | Wu et al. | |
| 2015/0012900 A1 | 1/2015 | Shifrin et al. | |
| 2016/0314578 A1 | 10/2016 | Banerjee et al. | |
| 2017/0161888 A1* | 6/2017 | Banerjee | G06T 7/0004 |

OTHER PUBLICATIONS

ISA/KR, Written Opinion of the International Searching Authority for PCT/US2016/064482 dated Mar. 13, 2017.

Diaconis, et al., Spearman's Footrule as a Measure of Disarray, Journal of the Royal Statistical Society, Series B (Methodological), vol. 39, No. 2, pp. 262-268 Apr. 1, 1977.

* cited by examiner

REDUCING REGISTRATION AND DESIGN VICINITY INDUCED NOISE FOR INTRA-DIE INSPECTION

CROSS-REFERENCE TO RELATED APPLICATIONS

This application claims priority to the provisional patent application filed Dec. 6, 2015 and assigned U.S. App. No. 62/263,665, the disclosure of which is hereby incorporated by reference.

FIELD OF THE DISCLOSURE

This disclosure relates to wafer inspection.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

A normalized cross-correlation (NCC) between the optics patch containing the pattern of interest (POI) and a template POI image that is randomly picked from one sample image can be used for POI image registration. Every POI image is aligned with the same template. If the randomly chosen template is a robust representation for this POI image population, this method may be valid for POI registration.

However, NCC die-to-die inspection does not consider the effects of POI vicinity design patterns. This is because, when comparing POI images from two adjacent dies, the common noise caused by the same vicinity cancels out. This may not be true for intra-die inspection where POI could occur anywhere within a die and could have different vicinity patterns. In that case, the POI images could be contaminated by the different vicinity design patterns. Thus, it may be important to analyze and reduce the noise induced by vicinity design patterns.

It can be difficult to tell whether the NCC method for POI images registration is adequate because the template is chosen randomly. If the template POI image has noise or defects, then aligning other POI images with it could cause misalignment errors.

For die-to-die, reference image and test image from adjacent dies are assumed to be aligned. If there is offset for the POI, the offset is the same for the two. Thus, the offset will not hurt the difference image. However, for intra-die, each POI has a different location and surrounding, which need to be verified as aligned. Otherwise, comparison is difficult or even impossible.

If the POI is too small or has insufficient geometry, it may not be a good registration target. The NCC method may fail for high demanding intra-die comparison tasks.

POI vicinity induced noise is canceled out in die-to-die inspection since both instances have the same vicinity of patterns. However, this is not true for intra-die inspection because vicinity pattern differences are an additional noise source for it.

Therefore, improved defect review techniques and, more particularly, improved intra-die inspection techniques are needed.

BRIEF SUMMARY OF THE DISCLOSURE

In a first embodiment, a system is disclosed. The system comprises a controller including a processor, an electronic data storage unit in electronic communication with the processor, and a communication port in electronic communication with the processor and the electronic data storage unit. The controller is configured to: group patterns-of-interest by co-occurrence of proximate registration targets into one or more alignment groups using an alignment target finder module; register each alignment group using the co-occurrence of proximate registration targets offset by a same amount from the patterns-of-interest; register by voting; and group the patterns-of-interest into at least one vicinity group with same vicinity design effects. The registering by voting includes measuring a degree that each of the patterns-of-interest is an outlier. The controller can be configured to perform intra-die inspection.

The controller can be in electronic communication with a design based binning server. The controller also can be in electronic communication with a review tool configured to generate a wafer image. In an instance, the review tool includes a stage configured to hold the wafer and an image generation system configured to generate the wafer image. The image generation system can be configured to use at least one of an electron beam, a broad band plasma, or a laser to generate the image of the wafer. In an example, the review tool is a scanning electron microscope.

The patterns-of-interest may be in a rendered image that is based on a design file. The patterns-of-interest also may be in a wafer image. In an instance, the wafer image is a scanning electron microscope image.

The controller can be further configured to perform intelligent sampling with a sampling module prior to the grouping into the one or more alignment groups.

In a second embodiment, a method is provided. The method comprises: grouping, using a controller, patterns-of-interest by co-occurrence of proximate registration targets into one or more alignment groups using an alignment target finder module; registering, using the controller, each alignment group using the co-occurrence of proximate registration targets offset by a same amount from the patterns-of-interest; registering by voting using the controller; and grouping, using the controller, the patterns-of-interest into at least one vicinity group with same vicinity design effects. The registering by voting includes measuring a degree that each of the patterns-of-interest is an outlier. The method may be for intra-die inspection.

Grouping patterns-of-interest with same vicinity design effects can occur before the registration by voting, in which case the registration by voting can be performed on each of the at least one vicinity group. Grouping patterns-of-interest with same vicinity design effects also can occur after the registration by voting.

The patterns-of-interest may be in a rendered image that is based on a design file. The patterns-of-interest also may be in a wafer image. In an instance, the wafer image is a scanning electron microscope image.

The method can further comprise intelligent sampling with a sampling module prior to the grouping into the one or more alignment groups.

The co-occurrence of proximate registration targets in each of the alignment groups may be offset by a same amount from the pattern-of-interest.

The registering by voting can be configured to use information from a whole image population by taking a robust mean image as a registration template.

The registration by voting can be configured to use information from a percentage of outliers in each of the alignment groups.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
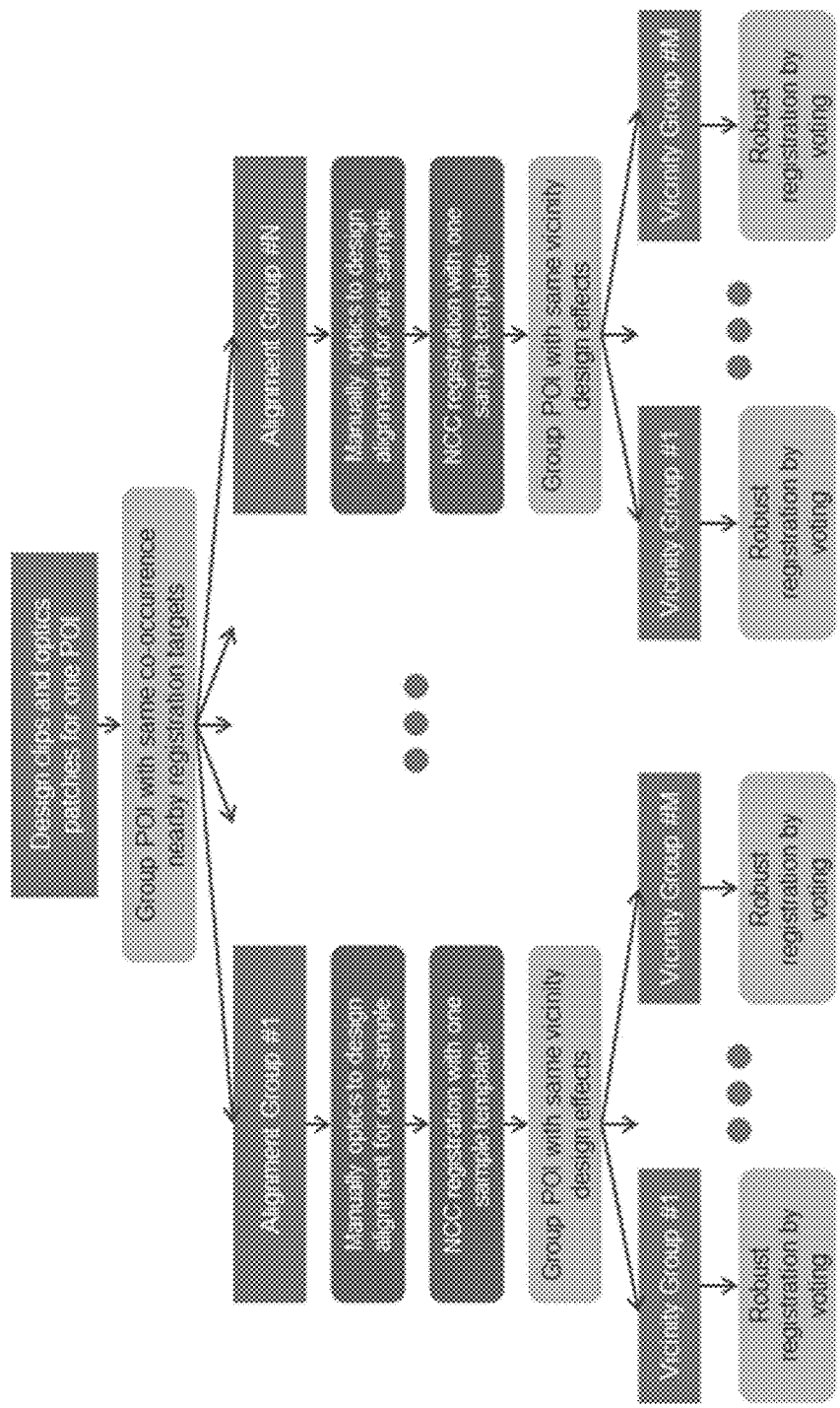
FIG. 1 is a flowchart of a first embodiment in accordance with the present disclosure.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The embodiments disclosed herein reduce the noise induced by pattern of interest (POI) image registration and POI vicinity design patterns, such as during intra-die inspection. Intra-die inspection refers to the method of comparing the same pattern across multiple (i.e., two or more) instances of that pattern on the same die. Intra-die inspection may focus on particular areas of interest (AOI) provided by a user, such as a semiconductor manufacturer. Embodiments disclosed herein can reduce the noise in the intra-die POI comparison caused by POI image misregistration and differences in POI vicinity design patterns.

Intra-die inspection has several advantages over the traditional die-to-die comparison inspection methods. These advantages include the observation that intra-die process variation noise can be less than die-to-die process variation because the same POI (pattern of interest) locations are closer to each other than in die-to-die, where the same POI are one die pitch apart. Moreover, systematic defects, such as variability in the printing of the same pattern in one part of the mask than in another (e.g., due to a defect on the mask or variation in the scanner field/focus) cannot be caught with the same sensitivity in die-to-die comparisons as in intra-die comparisons. This is because in die-to-die comparisons, both instances of the pattern may be affected in the same way and the difference signal does not show this anomaly. Intra-die comparison can catch such an anomaly because the two instances of the pattern in the same scanner field can show a difference signal.

However, intra-die inspection has many challenges. Unlike die-to-die, in which two POI images of one pair of dies are assumed to occur at the same location and share many common noise modes, intra-die inspection requires more accurate registration of every POI image with each other or a reference POI. Moreover, different instances of the same POI in a die can have design patterns in their vicinity that are different and hence can introduce different amounts of leakage of the signal from this vicinity area into the region constituting the POI.

The techniques disclosed herein use information from the whole POI image population to generate a robust mean POI image as the template for registration. A "voting" method is used to further refine the alignment. These techniques are more robust and accurate for intra-die inspection not only by using a robust mean POI image as the template, but also by using the L2-norm difference map instead of NCC map for searching the location because the L2-norm difference map has sharper valleys/peaks than the NCC map.

The problems of the NCC technique are addressed by grouping POI images which have the same co-occurring and good registration targets near the POI, and using those to correctly locate the POI in each such group. Embodiments disclosed herein group POI images with similar vicinity induced noise so that each group can be analyzed separately for finding outliers.

Figure 2:
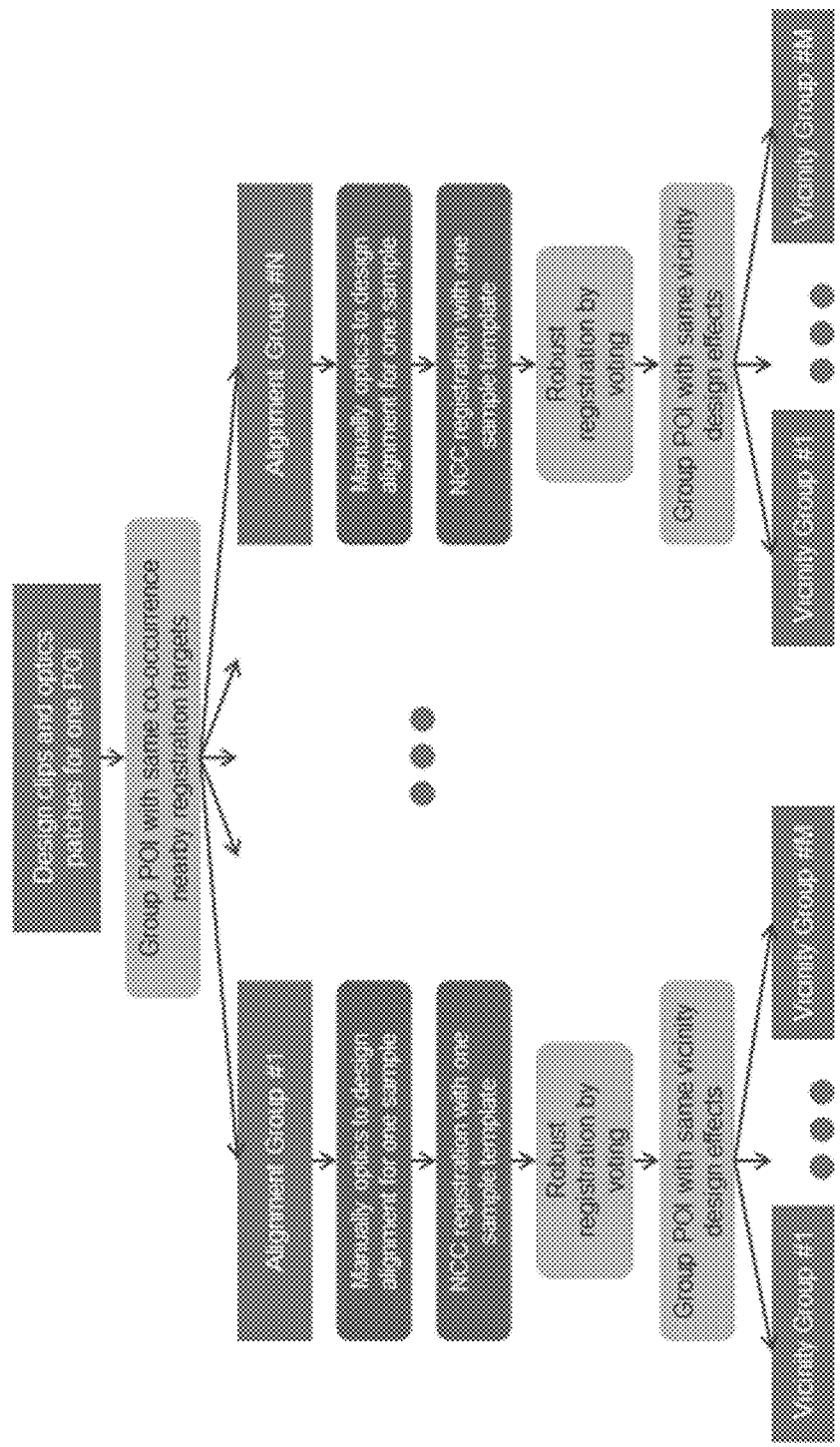
FIG. 2 is a flowchart of a second embodiment in accordance with the present disclosure.

The flowcharts in FIGS. 1-2 show techniques for reducing registration and design vicinity induced noise sources for intra-die inspection. Grouping POIs with the same vicinity design effects to generate "vicinity groups" may be needed when images in different vicinities are sufficiently different from each other. As shown in FIG. 1, robust registration can be provided by a voting procedure for a certain percentage of the outliers in each vicinity group. This can make the whole registration procedure more robust.

Figures 7A, 7B:
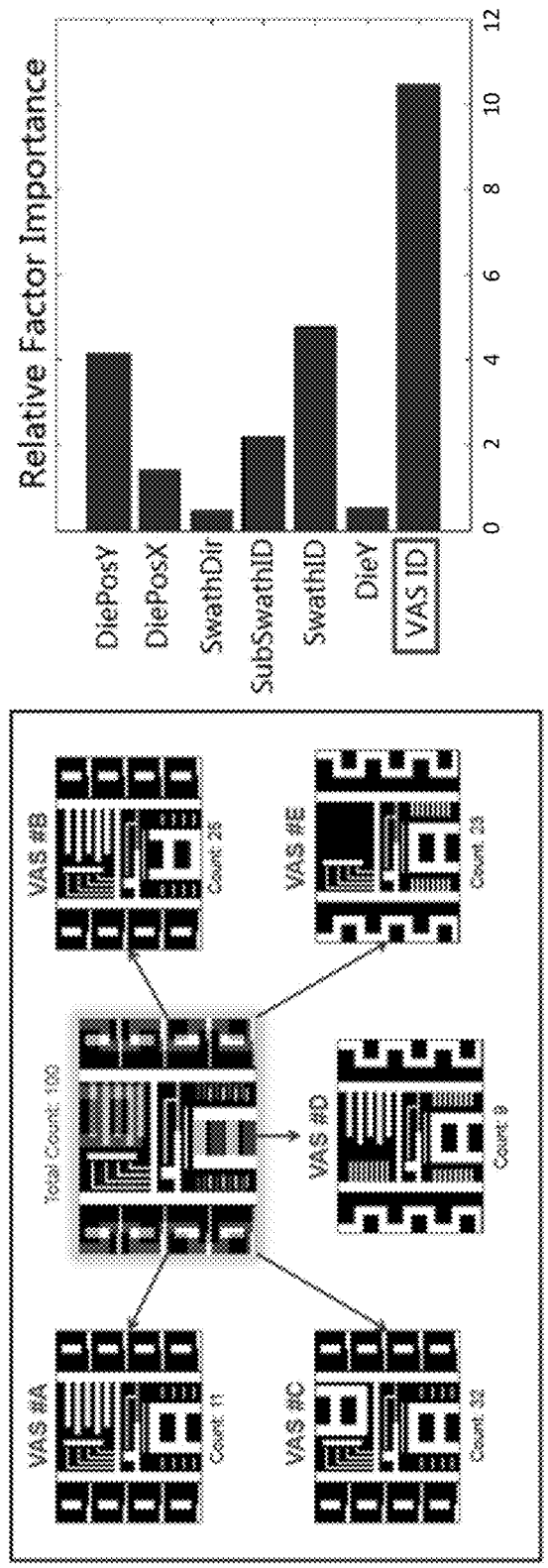
FIGS. 7A-7B are diagrams representing grouping POI vicinities using information from design clips and optics patches in accordance with the present disclosure.

The number of vicinity groups per image can vary. Four of five vicinity groups may be typically used, but other numbers of vicinity groups are possible. For example, FIG. 7A shows five vicinity groups. Factors such as design sizes, interaction distances, Optical Proximity Corrections (OPC), placement of Sub-Resolution Assist Features (SRAF), electromagnetic properties of the various materials involved, and optical effects can affect the number of vicinity groups.

Grouping POIs with the same co-occurring nearby registration targets to generate "alignment groups" may be used when the POI itself is not suitable for registration. As shown in FIG. 2, robust registration can be provided by a voting procedure for a certain percentage of the outliers in each alignment group. Since the robust registration method is used here, the results generally will not be affected much by different vicinity groups. In an instance, the algorithmic module that performs this grouping into alignment groups is called the Automatic Alignment Target Finder (AATF).

In an instance, there are from seven to fourteen alignment groups per image. However, other numbers of alignment groups are possible. Some alignment groups may be ignored or removed from consideration by a user.

To determine the outliers in a population, the rejection scores of each of the images in that population are computed, such as using techniques disclosed in U.S. application Ser. No. 15/135,465 filed Apr. 21, 2016. A percentage of the data in each alignment group with the highest rejection scores can be assumed to be outliers.

In an alternate embodiment, FIGS. 1-2 can be combined to apply the robust registration by voting procedure for a certain percentage of outliers two or more times to make the procedure more robust.

Figure 3:
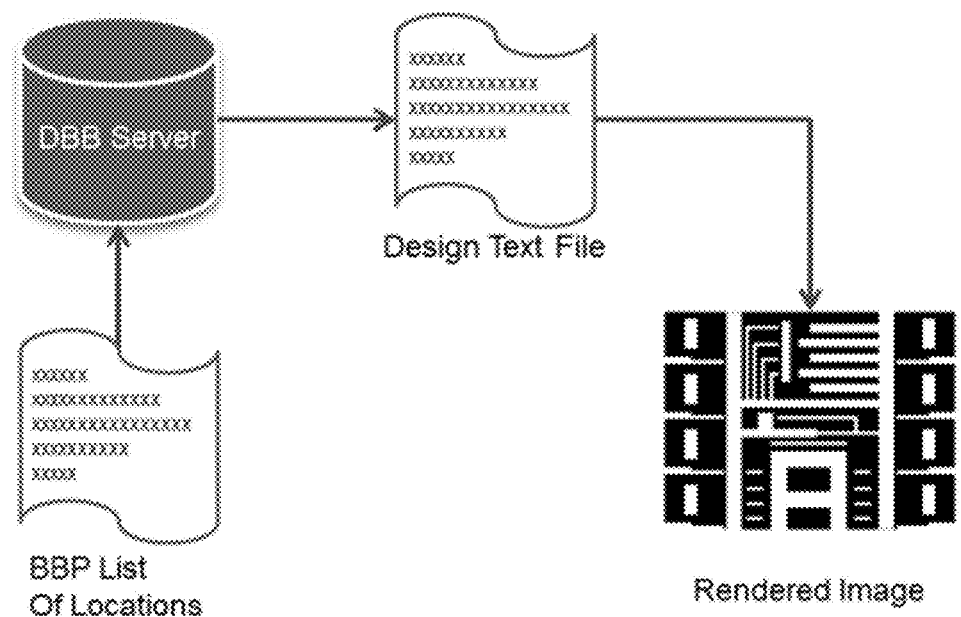
FIG. 3 is a diagram representing an embodiment of generating a rendered image in accordance with the present disclosure.

These embodiments can be used for intra-die inspection. Alignment flows for intra-die inspection if design data is or is not possessed are disclosed herein. SEM images can proxy for design rendered images if, for example, intelligent sampling is performed. Furthermore, even when a semiconductor manufacturer does not provide complete design data, the semiconductor manufacturer can specify the POI using a rendered image of the shapes in the POI, as shown in FIG. 3.

Design clips can be used in the embodiments disclosed herein, including those in FIGS. 1-2. Design data, when available, can be stored in a server, such as a design based binning (DBB) server, as shown in FIG. 3. An inspection tool (e.g., a broad band plasma (BBP) tool) can send locations to the DBB server and the DBB server can output a text file of all polygons that intersect a given field of view (FOV) for a given set of layers. From this text file, an image called the rendered image in FIG. 3 that shows all the polygons rendered at a user specified pixel size can be constructed. The rendered image in FIG. 3 shows an example of such a rendering, with the polygon interiors colored white and the background black. When design data is available, this rendered design is called a design clip.

Figure 4:
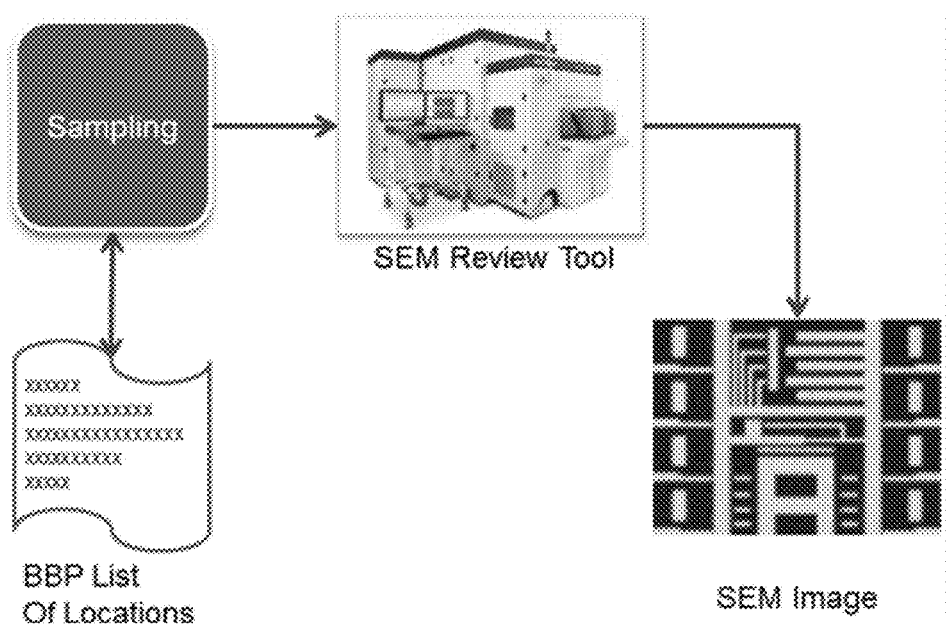
FIG. 4 is a is a diagram representing an embodiment of generating a scanning electron microscope (SEM) image in accordance with the present disclosure.

Design data may be unavailable. This may occur during a demo or a proof of concept (POC) study when the semiconductor manufacturer cannot share a sensitive design. In such a situation, a scanning electron microscope (SEM) can image the wafer locations being used as design clips in lieu of the rendered images. This is shown in FIG. 4.

Regardless whether the design clips are rendered images or SEM images, which may be approximately the same in some instances, the large volume of data that the BBP tool produces and the slowness of current SEM review tools in collecting images may pose a challenge to throughput of the analysis. To increase throughput, a reduction of the BBP tool data through intelligent sampling can be performed before image collection is delegated to the SEM review tool. The sampling module shown in FIG. 4 performs intelligent sampling, which can involve collecting several groups of samples depending upon intermediate analysis results. For example, see the "yes" pathway in FIG. 10 for whether the NCC score is less than a threshold.

Figure 10:
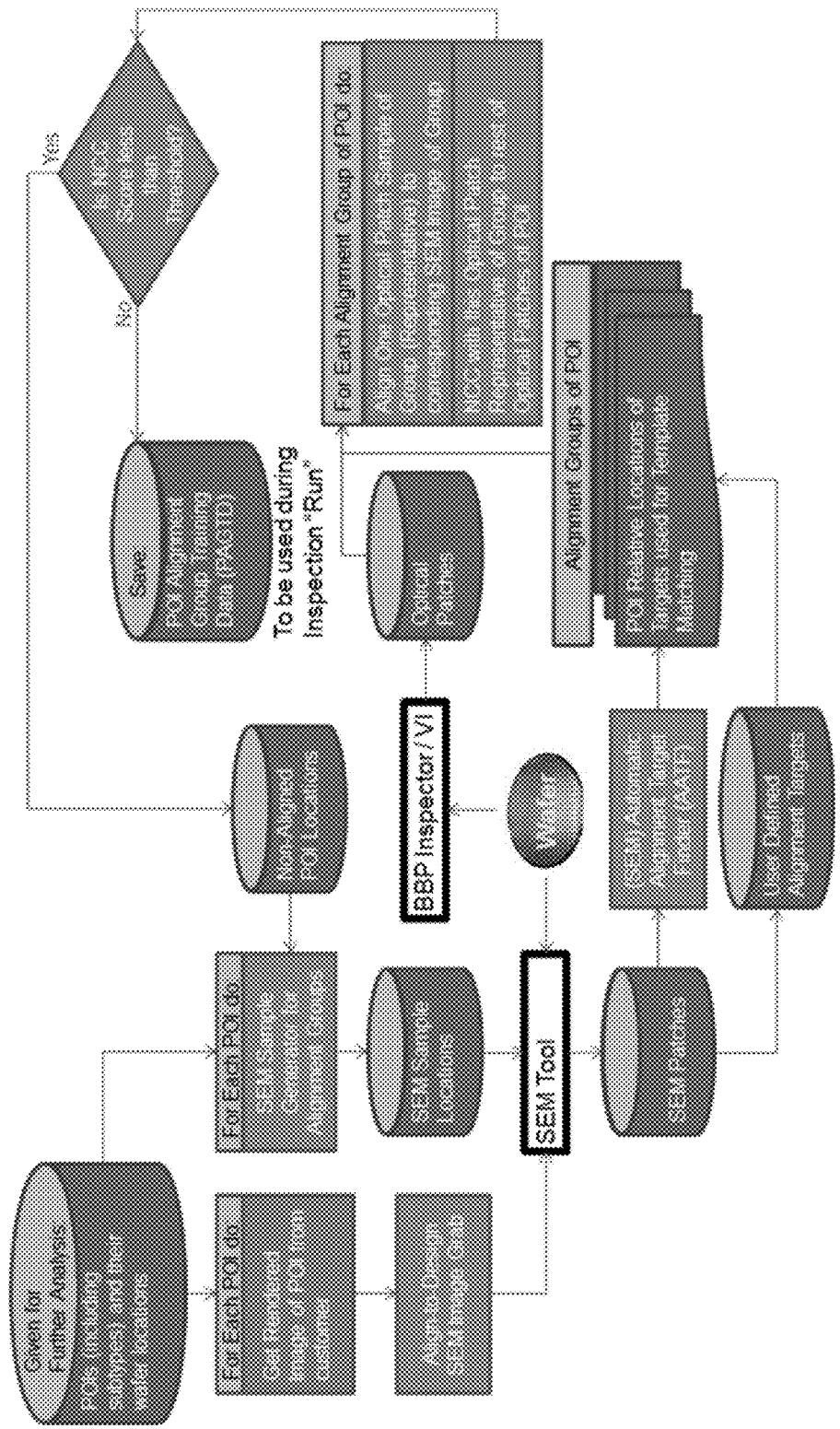
FIG. 10 is a flowchart of an embodiment in accordance with the present disclosure wherein the POI is not a good alignment target by itself and/or the design is unavailable, and SEM images are used instead of a design.

For the purpose of generating alignment groups, SEM Images can serve as design image proxies when design images themselves are unavailable. A large amount of time is generally required to acquire an SEM image of sufficient quality. To save time, the number of acquired SEM images may be limited through intelligent sampling. As seen in FIG. 10, if an optical patch of the POI does not match well with the representative of its group, then it probably belongs to a different alignment group from that of the representative, and the design proxy (e.g., the SEM image) corresponding to that mismatched optical patch location may be acquired. The decision diamond in FIG. 10 regarding the NCC score being less than the threshold can make a decision whether an optical patch of the POI matches or does not match the representative of its group. It can do this by checking the NCC match score of the alignment between the optical patch and its representative. For example, the lower the score, the worse the match. A match threshold (e.g., 75%) is chosen, and the decision diamond decides that the optical patch of the POI does not match its representative if the NCC match score between them falls below this threshold. The locations of all the non-matching (e.g., non-aligned) optical patches can then be dumped out as depicted in FIG. 10. Subsequently, SEM images can be acquired from these locations.

Registration-induced noise can be reduced by robust registration by voting. The traditional NCC registration method for POI images randomly picks one sample as a template, which may not be sufficiently robust. A voting method which takes information from the whole image population by taking the robust mean image as the registration template can be used. The robust mean image is the mean image of all the "inliers" in the whole population. "Inliers" and "outliers" can be determined by computing rejection scores such as described by in U.S. application Ser. No. 15/135,465 filed Apr. 21, 2016, which is incorporated by reference in its entirety. For example, digital image data of a POI can be transformed into a rejection score table. Rank-based, median-based, or cross rejection scoring can be used.

The L2-norm difference map can be considered as a type of noise because it includes the root mean square (RMS) residual noise of alignment. The voting method can use the entire population to calculate the robust mean as the registration template, which reduces the registration noise over this entire ensemble. In contrast, the traditional NCC method is forced to select a random sample as the registration template instead of the robust mean. This selection, because it is relatively arbitrary, may not reduce the registration noise over the entire population. For example, the random sample that is selected may be an outlier of the population.

POI can be grouped by co-occurrence of nearby registration targets. As POI become smaller, it can become harder to do POI image registration, especially when the POI is not a good registration target (e.g., too flat, one dimensional pattern, etc.). In this case, other registration targets as well as the POI itself may be needed for registration. This technique performed by the AATF module provides a way of grouping POI by co-occurrence of nearby registration targets into different alignment groups. Then registration is done within each alignment group using these co-occurring targets that are offset by the same amount from the POI.

Figure 6:
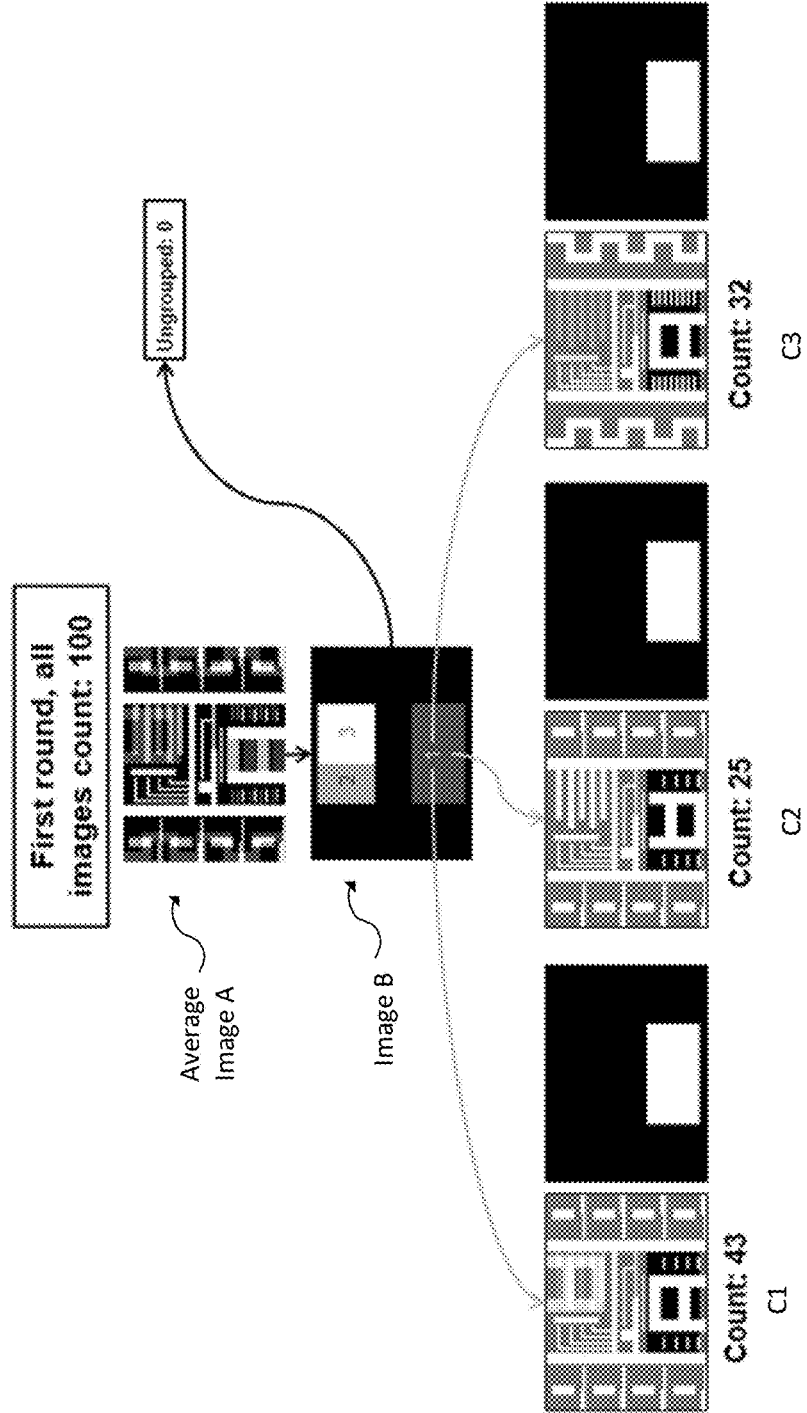
FIG. 6 is a diagram representing an embodiment of grouping design images from a product wafer in accordance with the present disclosure.

In AATF, a set of POI is split up into alignment groups using a sequence of image processing heuristics. FIG. 6 shows the average of 100 POI images aligned and stacked from top to bottom. There are several components in the Average Image A having high grayscales. These components may be common to a large number of the 100 POI images. AATF can divide the POI image set into subsets having common components. The first step of this, as shown in Image B, is to identify regions labeled 1, 2, and 3 having common components due to the high grayscales in the Average Image A. In an instance, region 1 of Image B is separated into the three pure (e.g., matching 100% among themselves within region 1) image sets C1, C2, and C3.

The quality of the POI as a registration target can be evaluated by studying the shape of its autocorrelation function, such as the NCC map of the target with itself, where the target is the template image and this template image padded by a small boundary of zeros that constitutes the reference image. In an instance, a difference measure indicating the rapidity of the fall from the center in both the x and y directions is evaluated and if this is above a preset threshold, then the registration target may be deemed to be good.

Vicinity induced noise can be reduced. Different vicinity design patterns may contribute different amounts of noise to the POI region. This technique is designed to group POI instances with same or similar vicinity effects into the same vicinity group and then compare these POIs with each other. First, multiple ways of generating vicinity groups can be found by clustering on design clips using different similarity thresholds. Then the effect of vicinity group labeling on POI optics images is analyzed. Finally, a meaningful "vicinity" grouping method is selected for further registration within each vicinity group.

Physical factors including design sizes, interaction distances, OPC, placement of SRAF, electromagnetic properties of the various materials involved, and optical effects can lead to vicinity influence distances that can stretch form nanometers to microns.

To group POI into vicinity groups, design clips may be evaluated using a similarity measure such as NCC. Then clustering can be performed by ensuring that all design clips belonging to the same cluster have a similarity measure above a certain predefined threshold between them. Other clustering methods based on similarity measures that can be used. For example, the techniques disclosed in Chapter 6 of Duda & Hart, Pattern Classification and Scene Analysis (1973), which is incorporated by reference in its entirety, can be used. Optionally, design clip clusters can be merged into vicinity groups of POIs using a similarity measure like NCC between the POIs in every pair of design clip clusters. Because of design similarity, the vicinity effects of all the POI corresponding to all the design clips within one cluster are similar. However, the design clips inside two different clusters may have similar vicinity effects in their corresponding POIs.

Given that full wafer coverage may be needed in intra die inspection, there can be two stages in the alignment flow: a setup stage and a run stage.

In the setup stage, one or more locations on a "golden" set of mutually aligned optical images containing said POI are determined for each POI (including its subtypes). This "golden" set is the representative of the alignment group for that POI. The can be referred to as the POI alignment group training data (PAGTD) of that POI. The PAGTD comprises of the mutually aligned optical images containing the POI, their robust means or medians, the template locations, etc. The one or more template locations identified on the PAGTD of a POI can be used to pinpoint the location of the POI it represents in any optical patch image (on the wafer) that contains said POI during the intra-die inspection "run."

A subtype of a POI is a spatial extension of the POI to cover other geometries in its surround. The definition of this subtype can be created by the user (e.g., the semiconductor manufacturer) for each POI type. This allows a further subdivision of each POI.

Figure 8:
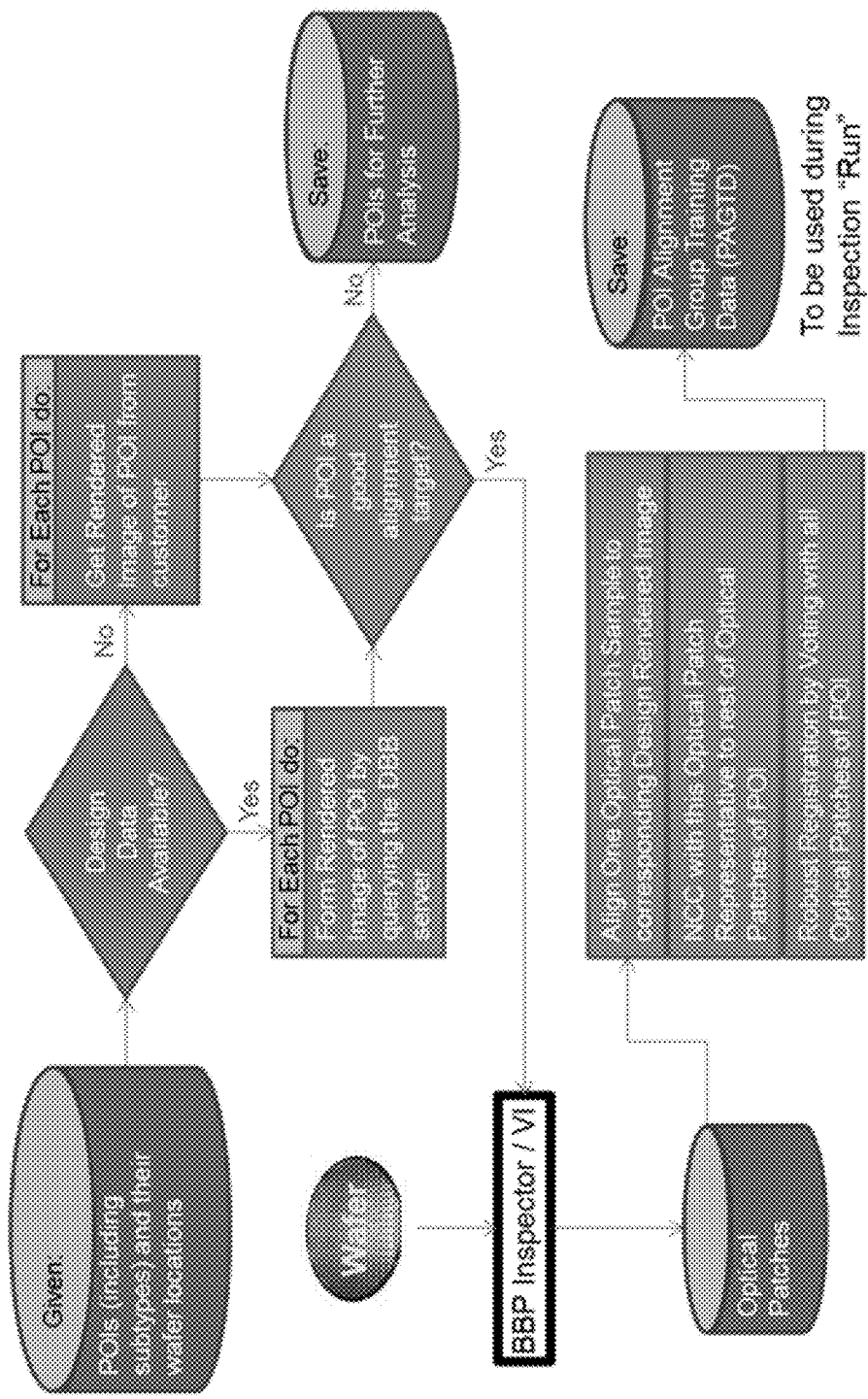
FIG. 8 is a flowchart of an embodiment in accordance with the present disclosure wherein optical images of POIs that are good alignment targets are separated out and form their own alignment groups.

During the initial step in an alignment flow setup, optical images of POIs that by themselves are good alignment targets are separated out. Thus, the images of these POIs form their own alignment groups. This flow is shown in FIG. 8.

Figure 9:
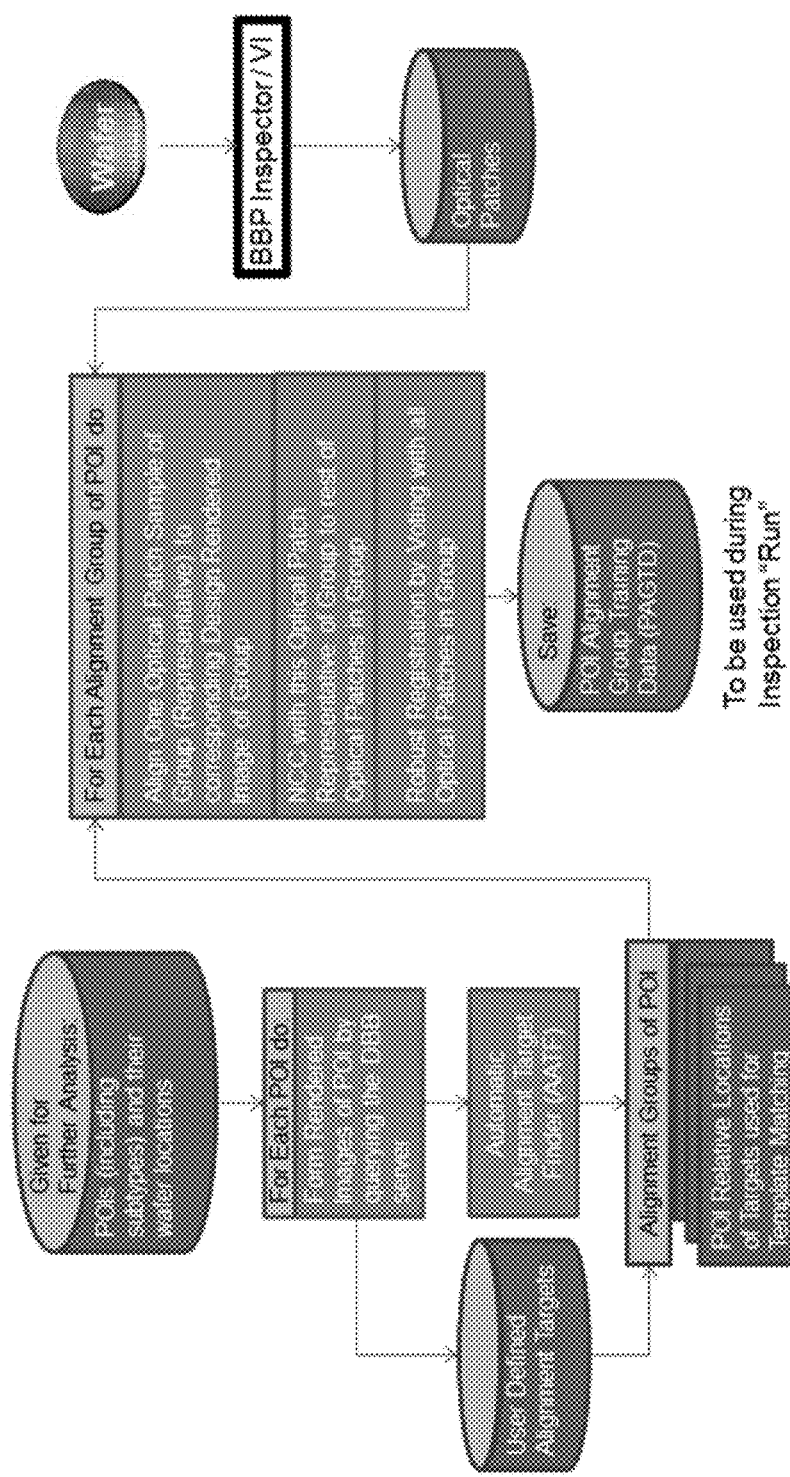
FIG. 9 is a flowchart of an embodiment in accordance with the present disclosure wherein the POI is not a good alignment target by itself and a design is available.

Alignment flow setup can occur with a design (e.g., with design rendered images). If the POI is not a good alignment target by itself and a design is available, the corresponding alignment flow is shown in FIG. 9. In this case, a POI is broken up into alignment groups by the AATF module, and the PAGTD includes data of POI alignment groups. The AATF module can be bypassed shown in FIG. 9 if the user defines alignment targets.

Alignment flow setup also can occur without a design (e.g., with SEM images). In case the POI is not a good alignment target by itself and/or the design is unavailable, and SEM images are used instead of a design, the corresponding alignment flow is shown in FIG. 10. Note that because of the slowness of a typical SEM review tool in collecting images, a subset of POI locations may be visited rather than the entire set and a sample of images is collected. It may become, therefore, a matter of probabilistic coverage and the sampling scheme allows for a loop for more complete coverage. This loop can ensure design clip proxy images are not missed. This loop is initiated by the decision diamond in FIG. 10, and a new sample of locations is created for an SEM image including locations which did not give good optical template matching scores. In this case, the alignment targets can be found in the SEM image automatically by use of an SEM AATF algorithmic module, or manually if the user defines them.

Figure 11:
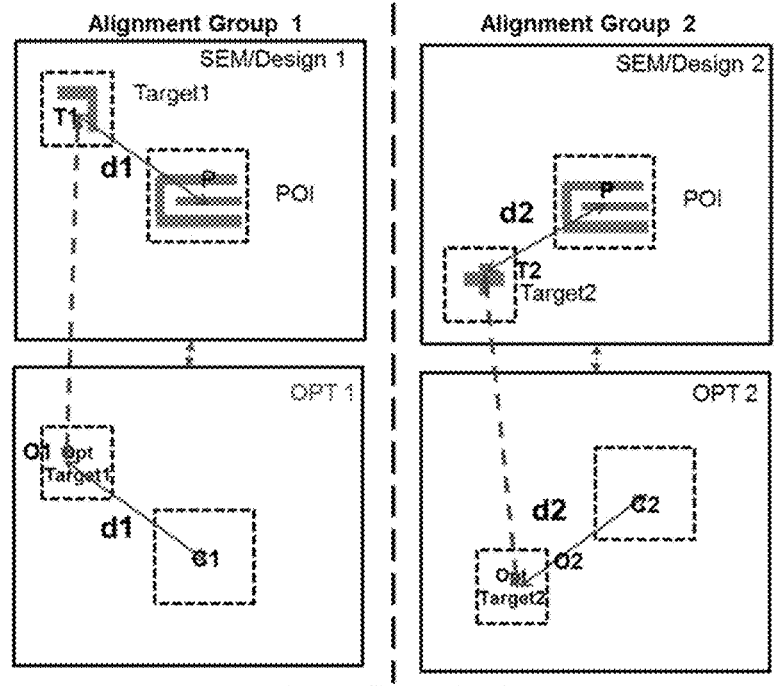
FIG. 11 is a diagram representing an embodiment wherein two groups are registered such that the location of the POI can be determined in accordance with the present disclosure.

The POI clips can be extracted by spatial correspondence between two or more alignment groups. Given two alignment groups of a POI, the two groups may be registered such that the location of the POI can be determined and, therefore, its image can be compared between both. FIG. 11 shows an example of this technique. The POIs in the two SEM/design images that represent the two alignment groups can be aligned to a subpixel level. Then the offsets of the POI from the template targets of those alignment groups can be defined to a subpixel level. By the spatial correspondence between the SEM/design images of the alignment groups and their aligned optical patch representatives, the position of the POI to a subpixel level in all optical patches containing it can be determined.

Figure 12:
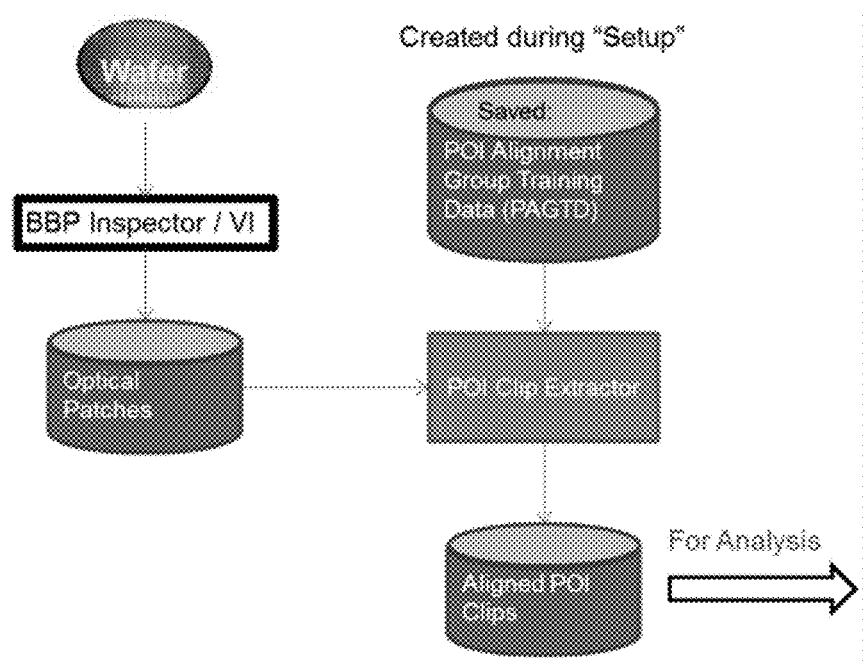
FIG. 12 is a flowchart of an embodiment of alignment flow during the inspection "run" in accordance with the present disclosure.

An alignment flow during the inspection "run" is shown in FIG. 12. It can use the PAGTD created during the setup phase, to extract the POI clip as detailed herein before sending it off for further analysis.

Robust registration by voting may be performed. The embodiments disclosed herein may be more robust because a robust mean POI image is used, which is the information from the whole population. A rejection score method, which can be used to quantitatively measure the degree to which each POI image is an outlier in the population of POI images without having to compute the robust mean image, can be used. Given a population of samples, outliers are found and ranked or scored by the degree to which each POI image is an outlier in the population of POI images. Optionally, the images are re-registered using the voting method on a certain percentage of the outliers in the population. Thus, the image can be moved to reduce the degree to which each POI image is an outlier in the population of POI images. The degree of movement to improve alignment or reduce the degree to which each POI image is an outlier in the population of POI images can vary. However, a goal of the registration by voting may be to minimize the score or rank so that as many points as possible are inliers in the distribution. The degree to which each POI image is an outlier can be calculated as a score based on, for example, rejection or deviation scoring methods.

Movement path can be used to reduce the degree to which each POI image is an outlier. When the robust mean template and the reference POI image are misaligned, the deviation score corresponding to the degree to which each POI image is an outlier of the reference image is large. When the robust mean template and the reference POI image are aligned, the deviation score is smaller.

For example, registration by voting may count how far away from a median each pixel is independently. This can sum the position of the outliers. An alignment pattern that provides the fewest outliers may be preferred by the voting registration. This can account for the individual contribution of each pixel.

Robust registration by voting can be used to improve results. Techniques disclosed herein may be more robust because each can use a robust mean POI image, which is the information from the whole population. A rejection score method may be used, which can quantitatively measure the degree to which each POI image is an outlier without having to compute the robust mean image. The images may be optionally re-registered using the voting technique on a certain percentage of the outliers in the population.

POI can be grouped by co-occurrence nearby registration targets. Embodiments disclosed herein can provide the ability to group POI images by co-occurrence of nearby registration targets to improve registration when the POI itself is not a good registration target. For example, co-occurring targets near the POI can be examined and only ones that are good for registration may be selected.

Vicinity-induced noise can be reduced. Techniques disclosed herein use design and/or optical images to group POIs into vicinity groups such that each group exhibits similar noise levels from the vicinity regions in terms of noise statistics (e.g., mean and standard deviation) for each pixel on the POI in every vicinity group. There may be a statistically significant difference in the noise contribution from one such group to another. This can reduce vicinity-induced noise. Low variance may be equivalent to high confidence in estimates of the noise parameters, which in turn can lead to a more accurate detection of outliers (e.g., defects) for every pixel on the POI in a vicinity group.

One example of grouping POI vicinities using information from design clips and optics patches is shown in FIGS. 7A-7B. FIG. 7A shows a grouping of similar design vicinities by clustering design clips. FIG. 7B shows the importance of "vicinity" grouping for predicting the outlier score using factor analysis methods. If the grouping is meaningful, the importance of "vicinity group" in the factor analysis chart will be seen as compared to other influencing factors such as die location and location within a die.

Figure 5:
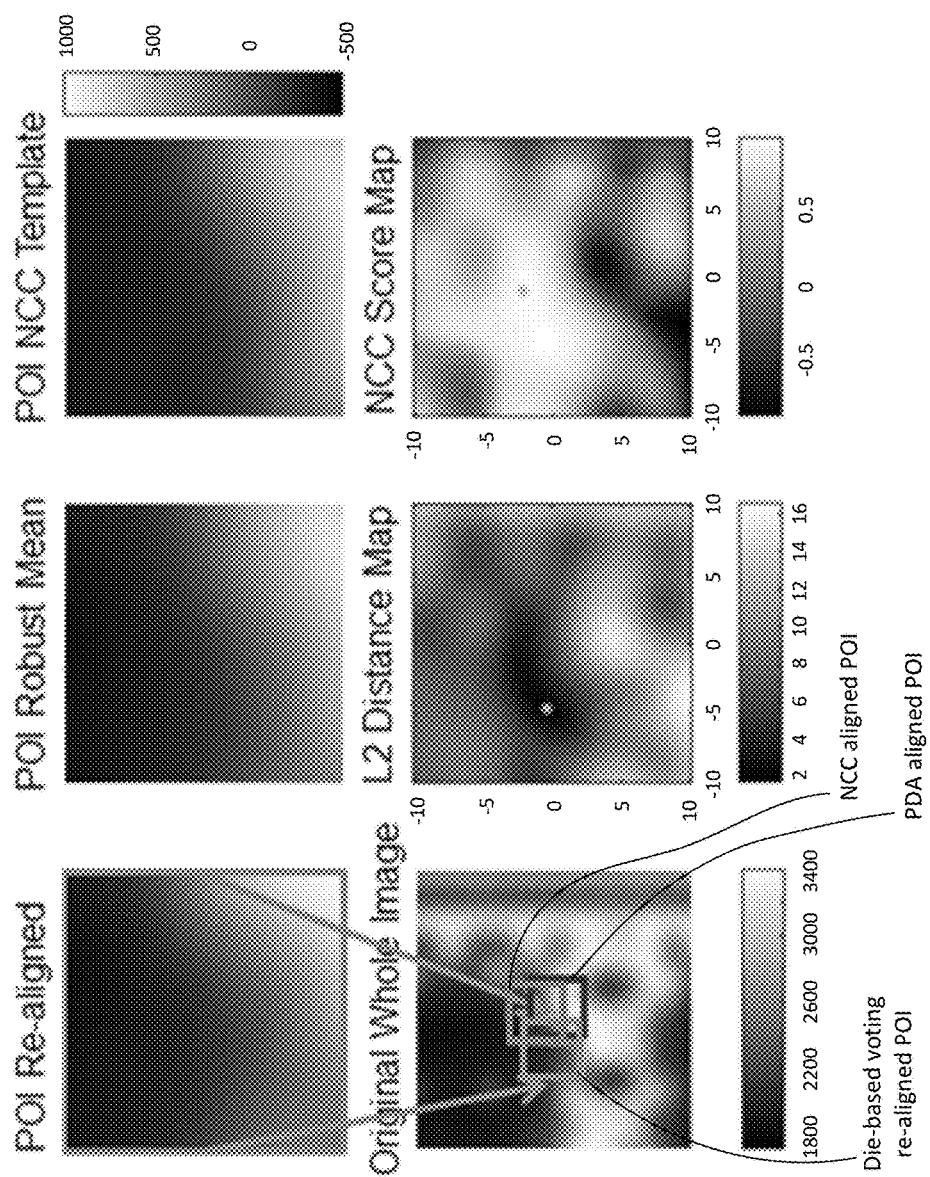
FIG. 5 is an example of robust registration.

Robust registration by voting also can be used to reduce registration-induced noise. One example of robust registration is shown in FIG. 5. The first row shows the voting re-aligned POI image of one sample, the robust mean POI, and the template used by traditional NCC registration. On the second row, the original whole optics patch before cropping, the L2-norm distance map, and the NCC searching map are shown. The boxes on the original optics patch show the initial location of POI provided by pixel to design alignment (PDA) that runs during inspection of the wafer, the registration result of NCC using the random template, and the registration result after the voting method was applied to it. The POI image clip resulting from the voting method is more similar to the robust mean POI than the clip resulting from the NCC method.

The L2-norm difference map and NCC map both can be used for template matching, but differ in multiple ways. For the L2-norm difference map, the matching statistic used is the generalized Euclidean distance (e.g., sum of squared differences) between the grayscales of the search image and the template image. Grayscale value pairs for a set of overlapping pixels in two images can be input for a matching statistic. The value of the statistic computed for every shift (x,y) of a template image can be written to an array, which can be referred to as a map. For NCC, the matching statistic used is the Pearson Correlation Coefficient, which is bounded between −1 and +1. An exact match occurs when the value of the matching statistic is 0 for the L2-norm difference map whereas an exact match occurs when the value of the matching statistic is +1 for NCC. Thus, the best match occurs at the minimum for a L2-norm difference map and a maximum for NCC.

Grouping POI by co-occurrence of nearby registration targets also can be used to reduce registration-induced noise. One example of grouping design images from a product wafer is shown in FIG. 6. One hundred images are grouped into three groups. Design images in one group share the same co-occurrence registration targets highlighted by the purity mask. The co-occurring targets inside the purity masks along with the POI itself can be used for better registration.

Figure 13:
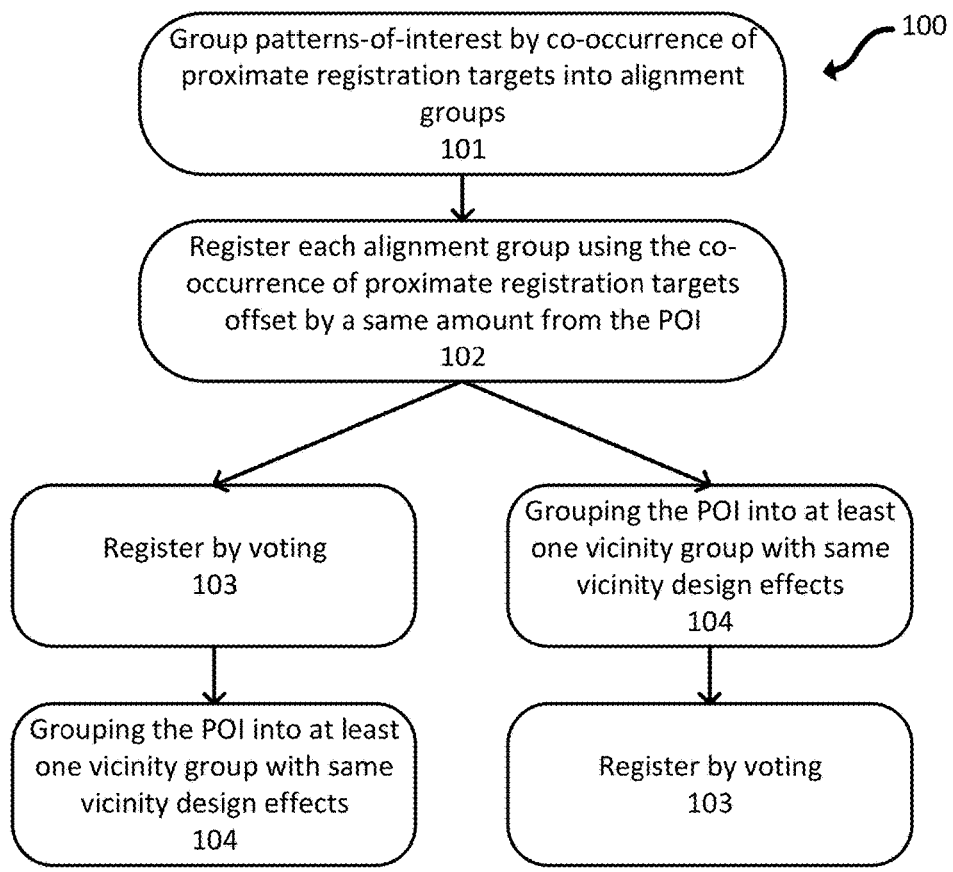
FIG. 13 is a flowchart of an embodiment of registration in accordance with the present disclosure.

FIG. 13 is a flowchart of an embodiment of registration. In the method 100, which can be used for intra-die inspection, POI are grouped 101 by co-occurrence of proximate registration targets into one or more alignment groups. The co-occurrence of proximate registration targets in each of the alignment groups may be offset by a same amount from the POI. The POI may be in a rendered image based on a design file and/or in a wafer image, such as an SEM image. Grouping 101 can use an alignment target finder module. Each alignment group is registered 102 using the co-occurrence of proximate registration targets offset by a same amount from the POI. Following the registering 102, registering by voting 103 and grouping 104 the POI into vicinity groups occur. Registering by voting 103 can include measuring a degree that each of the POI is an outlier. Grouping 104 the POI into at least one vicinity group forms vicinity groups with same vicinity design effects.

The grouping 104 can occur after the registering by voting 103. The registering by voting 103 also can occur after the grouping 104, in which case the registering by voting 103 is performed on each of the at least one vicinity group.

The method 100 can further include intelligent sampling with a sampling module prior to the grouping 101 into the one or more alignment groups.

Registering by voting 103 can use information from a whole image population by taking a robust mean image as a registration template. Registering by voting 103 also can use information from a percentage of outliers in each of the alignment groups.

Embodiments disclosed herein are designed to be more robust and accurate for registration of POI images, which may be suitable for the more stringent requirements of intra-die inspection. The techniques of the present disclosure provide a way for registration of POIs when the POI itself is not a suitable target template. This may become necessary when the POI area becomes too small to be aligned accurately or when POI images get too much noise from different patterns in their vicinity.

Embodiments disclosed herein can align a population of images to one another, which may be useful for intra-die inspection of POI populations. AATF and vicinity grouping can enable this robust registration in spite of the changes in design surrounding the POI and changes in its optical response.

While disclosed with respect to intra-die inspection, embodiments disclosed herein can be used with other applications. For example, die-to-die inspection can use the robust registration and the co-occurrence target registration methods to provide more robust and accurate registration when the current inline registration methods fail. Any post-inspection analysis of defects that occur at or near the same geometry location may require that the optical patches be aligned to each other before such analysis is performed, for example, to rank the defects for sampling.

Figure 14:
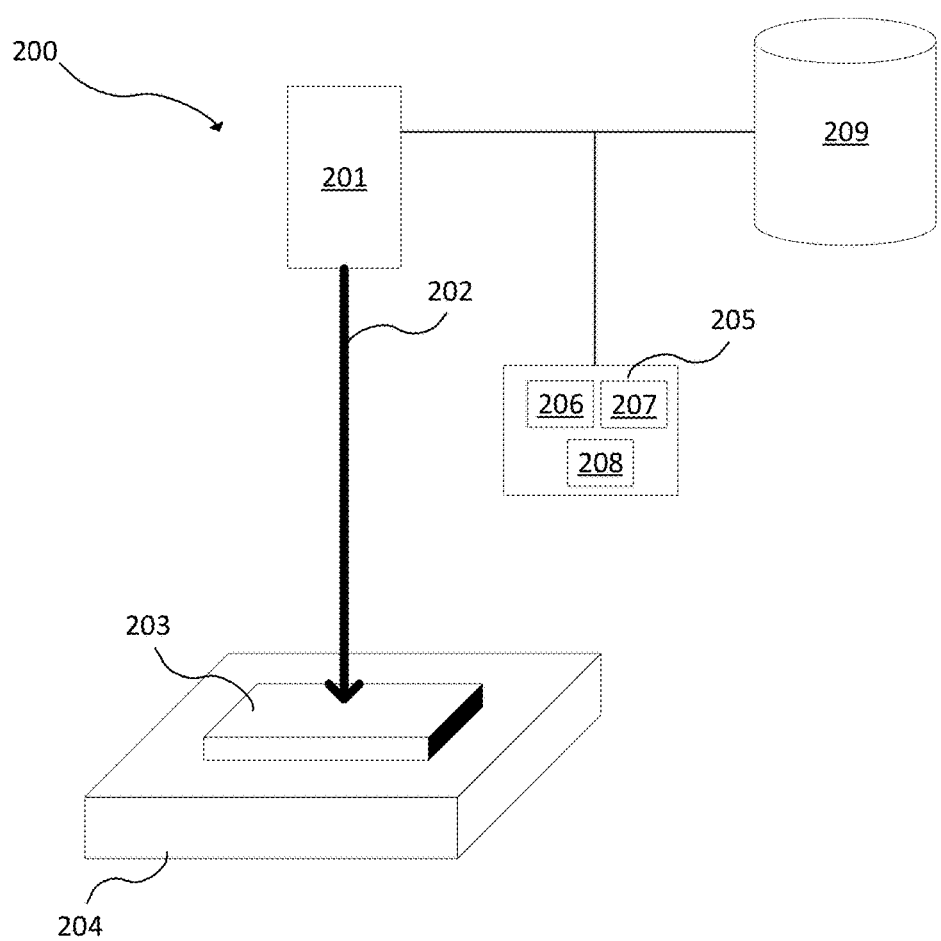
FIG. 14 is an embodiment of a system in accordance with the present disclosure.

FIG. 14 is a block diagram of a system in accordance with the present disclosure. A controller 205 is in electronic communication with a defect review system 200 and/or a design based binning (DBB) server 209.

The defect review system 200 includes a stage 204 configured to hold a wafer 203 or other workpiece. The stage 204 may be configured to move or rotate in one, two, or three axes. The defect review system 200 also includes an image generation system 201 configured to generate an image of a surface of the wafer 203. The image may be for a particular layer or region of the wafer 203. In this example, the image generation system 201 produces an electron beam 202 to generate a test image 203. Other image generation systems 201 are possible, such as those that use broad band plasma or laser scanning. For example, dark field imaging or bright field imaging can be performed by the image generation system 201. The defect review system 200 and/or image generation system 201 can generate a test image of the wafer 203.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

In a particular example, the defect review system 200 is part of or is a scanning electron microscope (SEM). Images of the wafer 203 are generated by scanning the wafer 303 with a focused electron beam 202. The electrons are used to produce signals that contain information about the surface topography and composition of the wafer 203. The electron beam 202 can be scanned in a raster scan pattern, and the position of the electron beam 202 can be combined with the detected signal to produce an image.

The DBB server 209 is configured to store design images for semiconductor wafers or other workpieces.

The defect review system 200 and the DBB server can communicate with the controller 205. For example, the controller 205 can communicate with the image generation system 201 or other components of the defect review system 200. The controller 205 can include a processor 206, an electronic data storage unit 207 in electronic communication with the processor 206, and a communication port 208 in electronic communication with the processor 206. It is to be appreciated that the controller 205 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 205 to implement the various methods and functions described herein may be stored in controller readable storage media, such as a memory in the electronic data storage unit 207, within the controller 205, external to the controller 205, or combinations thereof.

The controller 205 may be coupled to the components of the defect review system 200 or DBB server 209 in any suitable manner (e.g., via one or more transmission media, which may include "wired" and/or "wireless" transmission media) such that the controller 205 can receive the output generated by the defect review system 200, such as output from the imaging device 201, or output generated by the DBB server 209. The controller 205 may be configured to perform a number of functions using the output. For instance, the controller 205 may be configured to review defects on the wafer 203 using the output. In another example, the controller 205 may be configured to send the output to an electronic data storage unit 207 or another storage medium without performing defect review on the output. The controller 205 may be further configured as described herein, such as to perform the embodiments of FIG. 1, 2, or 13.

The controller 205, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a controller for performing a computer-implemented method for identifying abnormalities on a wafer or detecting compliance/non-compliance, as disclosed herein. In particular, as shown in FIG. 13, electronic data storage unit 207 or other storage medium may contain non-transitory computer-readable medium that includes program instructions executable on the controller 205. The computer-implemented method may include any step(s) of any method(s) described herein.

Program instructions implementing methods such as those described herein may be stored on computer-readable medium, such as in the electronic data storage unit 207 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Controller 205 may be configured according to any of the embodiments described herein. For example, the controller 205 may be programmed to perform some or all of the steps of FIG. 1, 2, or 13.

While disclosed as part of a defect review system, the controller 205 described herein may be configured for use with inspection systems. In another embodiment, the controller 205 described herein may be configured for use with a metrology system. Thus, the embodiments as disclosed herein describe some configurations for classification that can be tailored in a number of manners for systems having different imaging capabilities that are more or less suitable for different applications.

Each of the steps of the method may be performed as described further herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a controller including a processor, an electronic data storage unit in electronic communication with the processor, and a communication port in electronic communication with the processor and the electronic data storage unit, wherein the controller is configured to:
   group patterns-of-interest by co-occurrence of proximate registration targets into one or more alignment groups using an alignment target finder module;
   register each alignment group using the co-occurrence of proximate registration targets offset by a same amount from the patterns-of-interest;
   register by voting, wherein the registering by voting includes measuring a degree that each of the patterns-of-interest is an outlier; and
   group the patterns-of-interest into at least one vicinity group with same vicinity design effects;
   wherein the controller is in electronic communication with a review tool configured to generate a wafer image, wherein the review tool includes:
   a stage configured to hold a wafer; and
   an image generation system configured to generate the wafer image, wherein the image generation system is configured to use at least one of an electron beam, a broad band plasma, or a laser to generate the image of the wafer.

2. The system of claim 1, wherein the controller is in electronic communication with a design based binning server.

3. The system of claim 1, wherein the review tool is a scanning electron microscope.

4. The system of claim 1, wherein at least some of the patterns-of-interest are in a rendered image that is based on a design file.

5. The system of claim 1, wherein at least some of the patterns-of-interest are in the wafer image.

6. The system of claim 5, wherein the wafer image is a scanning electron microscope image.

7. The system of claim 1, wherein the controller is further configured to perform intelligent sampling with a sampling module prior to the grouping into the one or more alignment groups.

8. The system of claim 1, wherein the controller is configured to perform intra-die inspection.

9. A method comprising:
   receiving, at a controller, a wafer image from a review tool, wherein the review tool is configured to use at least one of an electron beam, a broad band plasma, or a laser to generate the wafer image of a wafer on a stage configured to hold the wafer;
   grouping, using the controller, patterns-of-interest by co-occurrence of proximate registration targets into one or more alignment groups using an alignment target finder module, wherein at least some of the patterns-of-interest are in the wafer image;
   registering, using the controller, each alignment group using the co-occurrence of proximate registration targets offset by a same amount from the patterns-of-interest;
   registering by voting using the controller, wherein the registering by voting includes measuring a degree that each of the patterns-of-interest is an outlier; and
   grouping, using the controller, the patterns-of-interest into at least one vicinity group with same vicinity design effects.

10. The method of claim 9, wherein the grouping patterns-of-interest with same vicinity design effects occurs before the registration by voting, and wherein the registration by voting is performed on each of the at least one vicinity group.

11. The method of claim 9, wherein the grouping patterns-of-interest with same vicinity design effects occurs after the registration by voting.

12. The method of claim 9, wherein at least some of the patterns-of-interest are in a rendered image that is based on a design file.

13. The method of claim 9, wherein the wafer image is a scanning electron microscope image.

14. The method of claim 9, further comprising intelligent sampling with a sampling module prior to the grouping into the one or more alignment groups.

15. The method of claim 9, wherein the co-occurrence of proximate registration targets in each of the alignment groups is offset by a same amount from the pattern-of-interest.

16. The method of claim 9, wherein the registering by voting is configured to use information from a whole image population by taking a robust mean image as a registration template.

17. The method of claim 9, wherein the registration by voting is configured to use information from a percentage of outliers in each of the alignment groups.

18. The method of claim 9, wherein the method is for intra-die inspection.

* * * * *